(12) United States Patent
Krowitz et al.

(10) Patent No.: US 11,481,792 B2
(45) Date of Patent: Oct. 25, 2022

(54) METHOD OF TRAINING MACHINE LEARNING MODELS FOR MAKING SIMULATED ESTIMATIONS

(71) Applicant: KRONOS TECHNOLOGY SYSTEMS LIMITED PARTNERSHIP, Lowell, MA (US)

(72) Inventors: Alexander Krowitz, Chelmsford, MA (US); Martin Tapp, Montreal (CA)

(73) Assignee: Kronos Technology Systems Limited Partnership, Lowell, MA (US)

(*) Notice: Subject to any disclaimer, the term of this patent is extended or adjusted under 35 U.S.C. 154(b) by 0 days.

(21) Appl. No.: 17/036,050

(22) Filed: Sep. 29, 2020

(65) Prior Publication Data

US 2021/0166252 A1 Jun. 3, 2021

Related U.S. Application Data

(63) Continuation of application No. 16/041,727, filed on Jun. 21, 2018, now Pat. No. 11,068,916.

(Continued)

(51) Int. Cl.
*G06Q 30/02* (2012.01)
*G06N 7/00* (2006.01)
(Continued)

(52) U.S. Cl.
CPC ......... *G06Q 30/0202* (2013.01); *G06N 5/003* (2013.01); *G06N 7/00* (2013.01);
(Continued)

(58) Field of Classification Search
CPC ....... G06Q 30/0202; G06Q 10/063116; G06N 20/20; G06N 20/00; G06N 5/003; G06N 7/00; G06N 3/02; G06N 5/02
See application file for complete search history.

(56) References Cited

U.S. PATENT DOCUMENTS 6,823,315 B1 11/2004 Bucci et al.
7,130,807 B1 10/2006 Mikurak
(Continued)

FOREIGN PATENT DOCUMENTS

| CA | 2847560 A1 | 6/2014 | |
| CN | 1595400 A | 3/2005 | |
| DE | 102016225366 A1 * | 6/2018 | ......... G06F 21/6245 |

OTHER PUBLICATIONS

FFli, Özden Gür, et al. Pooling information across SKUs for demand forecasting with data mining, working paper, 2007. Reference W (Year: 2007).*

(Continued)

*Primary Examiner* — Crystol Stewart
*Assistant Examiner* — Hamzeh Obaid
(74) *Attorney, Agent, or Firm* — GTC Law Group PC & Affiliates

(57) ABSTRACT

A computer-implemented method of training machine learning models for making simulated estimations is provided. The method includes collecting, from a database, a set of historical data, applying one or more transformations to the set of historical data to create a set of model features, and separating the set of model features into one or more pools, each pool comprising one or more model features of the set that are homogeneous with respect to a common value. the method further includes, for each pool, dynamically creating a training set that includes the one or more sets of model features of the pool and at least some of the historical data. The method further includes, for each training set, training a machine learning model on the training set.

12 Claims, 7 Drawing Sheets

Related U.S. Application Data

(60) Provisional application No. 62/524,792, filed on Jun. 26, 2017.

(51) Int. Cl.

| | | |
|---|---|---|
| *G06Q 10/06* | (2012.01) | |
| *G06N 20/00* | (2019.01) | |
| *G06N 5/00* | (2006.01) | |
| *G06N 20/20* | (2019.01) | |
| *G06N 3/02* | (2006.01) | |
| *G06N 5/02* | (2006.01) | |

(52) U.S. Cl.
CPC ............ *G06N 20/00* (2019.01); *G06N 20/20* (2019.01); *G06Q 10/063116* (2013.01); *G06N 3/02* (2013.01); *G06N 5/02* (2013.01)

(56) References Cited

U.S. PATENT DOCUMENTS

| | | | |
|---|---|---|---|
| 7,222,082 B1 | 5/2007 | Adhikari et al. | |
| 7,698,055 B2 | 4/2010 | Horvitz et al. | |
| 7,953,681 B2 | 5/2011 | Rai | |
| 8,306,847 B2 | 11/2012 | Sperry | |
| 8,417,715 B1* | 4/2013 | Bruckhaus | G06Q 30/0202 707/758 |
| 8,896,863 B2 | 11/2014 | Hu et al. | |
| 9,354,578 B2 | 5/2016 | Yeh | |
| 9,460,401 B2 | 10/2016 | Zeng et al. | |
| 10,049,374 B2 | 8/2018 | Jha et al. | |
| 10,748,072 B1 | 8/2020 | Seeger et al. | |
| 11,068,916 B2 | 7/2021 | Scarpati et al. | |
| 2003/0200134 A1 | 10/2003 | Leonard et al. | |
| 2007/0208693 A1* | 9/2007 | Chang | G06F 16/9024 |
| 2008/0183553 A1 | 7/2008 | Cao et al. | |
| 2009/0198559 A1 | 8/2009 | Wang et al. | |
| 2009/0319456 A1* | 12/2009 | Consul | H04L 51/12 706/21 |
| 2009/0327033 A1 | 12/2009 | Rai et al. | |
| 2010/0106561 A1 | 4/2010 | Peredriy et al. | |
| 2010/0205039 A1 | 8/2010 | Basak et al. | |
| 2011/0196718 A1 | 8/2011 | Kulkarni et al. | |
| 2012/0330717 A1 | 12/2012 | Subramanian et al. | |
| 2014/0351011 A1 | 11/2014 | Wang et al. | |
| 2015/0032502 A1* | 1/2015 | Green | G06Q 30/0201 705/7.29 |
| 2015/0317589 A1 | 11/2015 | Anderson et al. | |
| 2016/0275413 A1* | 9/2016 | Shi | G06N 20/00 |
| 2017/0132548 A1* | 5/2017 | Majumder | G06Q 10/067 |
| 2017/0278053 A1* | 9/2017 | High | G06Q 10/087 |
| 2018/0285682 A1* | 10/2018 | Najibi | G06K 9/6289 |
| 2018/0374109 A1 | 12/2018 | Scarpati et al. | |

OTHER PUBLICATIONS

Trapero, Juan R., Nikolaas Kourentzes, and Robert Fildes. "On the identification of sales forecasting models in the presence of promotions." Journo/ of the operational Research Society 66.2 (2015): 299-307. Z (hereinafter Trapero) (Year: 2015).*

FAli, Özden Gür, et al. Pooling information across SKUs for demand forecasting with data mining. working paper, 2007. Reference W (Year: 2007).*

Gaussier, Eric, et al. "Improving backfilling by using machine learning to predict running times." Proceedings of the International Conference for High Performance Computing, Networking, Storage and Analysis. ACM, 2015. Reference X (Year: 2015).*

Capistran, et al., ""Forecast combination with entry and exit of experts"", St. Louis: Federal Reserve Bank of St. Louis, 2008.

Gaussier, et al., ""Improving backfilling by using machine learning to predict running times"", Proceedings of the International Conference for High Performance Computing, Networking, Storage and Analysis, 2005.

Gur, et al., "Pooling information across SKUs for demand forecasting with data mining", 2007.

Riemer, et al., ""Correcting Forecasts with Multifactor Neural Attention"", Proceedings of the 33rd International Conference on Machine Learning, 2016, 48.

Trapero, et al., ""On the identification of sales forecasting models in the presence of promotions"", Journal of the operational Research Society 66.2, 2015, 299-307.

Bala, Pradip Kumar, "Improving inventory performance with clustering based demand forecasts", Journal of Modelling in Management7. 1: 23-37. Emerald Group Publishing Limited., 2012, 16 pages.

Zhou, Qifeng , et al., "A two-step dynamic inventory forecasting model for large manufacturing", 2015 IEEE 14th International Conference on Machine Learning and Applications (ICMLA)., 2015, 5 pages.

* cited by examiner

METHOD OF TRAINING MACHINE LEARNING MODELS FOR MAKING SIMULATED ESTIMATIONS

CROSS-REFERENCE TO RELATED APPLICATIONS

This application is a continuation of U.S. non-Provisional patent application Ser. No. 16/014,727, filed Jun. 21, 2018, and entitled "USING MACHINE LEARNING TO PREDICT RETAIL BUSINESS VOLUME".

U.S. non-Provisional patent application Ser. No. 16/014,727 claims the benefit of priority to U.S. Provisional Patent Application Ser. No. 62/524,792, filed Jun. 26, 2017, and entitled "USING MACHINE LEARNING TO PREDICT RETAIL BUSINESS VOLUME".

Each of the foregoing applications is incorporated herein by reference in its entirety.

BACKGROUND OF THE INVENTION

Various embodiments relate generally to predictive systems, methods, devices and computer programs and, more specifically, relate to using machine learning to provide accurate forecasts.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Machine learning regression is a form of artificial intelligence that can be employed to model numeric patterns based on historical data. Machine learning regression may take advantage of "training" examples to capture characteristics of interest of their unknown underlying probability distribution. This allows regression methods to dynamically construct complex prediction formulas tailored to individual business patterns. Training data may be seen as examples that illustrate relations between observed variables. In addition, because machine learning regression algorithms can dynamically determine important feature combinations, training can be conducted using a "pool" of data from, in the current setting, many similar stores or departments, not just the single store that is being predicted. This allows systems to detect patterns that may be rare in a single store, but common across the organization, and apply the detected pattern in future predictions.

Some conventional systems address using business volume forecasts to determine workload requirements though these systems do not integrate multiple sources of data.

Other conventional systems use a two-stage architecture with a focus on periodic features, use hierarchical forecasting of demand with a focus on combining multiple demands, focus on atypical events and/or focus on neural net architecture to incorporate external features.

Businesses using these conventional systems expend resources on manual correction of schedules due to the inaccuracy of current systems.

What is needed is a method to use machine learning to provide accurate forecasts without the problems inherent in the prior systems. Such improved predictions can curtail such expenditures, allowing employees and the organization to focus their efforts on their core missions.

BRIEF SUMMARY OF THE INVENTION

The below summary is merely representative and non-limiting.

The above problems are overcome, and other advantages may be realized, by the use of the embodiments.

Whereas prior approaches may rely on static formulas with fixed inputs, the machine learning method used by various embodiments can be dynamic. Features such as windowed-trends or seasonality that are not useful in predicting business volume can be ignored in irrelevant situations and used in situations where they are beneficial. Hence, a machine learning method can be used with significantly more input data and more features than traditional static formulas. This expansion of data includes the training process, which benefits by combining data from many stores or departments into a single "pool" that generates a complex model used in the prediction phase to make predictions for each individual unit. In addition, new types of historical data can be easily introduced into the modeling process. Third party data that is external to the main business, such as weather and local event calendars, can be added when they become available, without the need for algorithm changes or significant configuration changes.

In a first aspect, an embodiment provides a method that uses machine learning regression to predict business volume based on historical retail business data. The method may be employed in multiple types of retail business volumes, including sales volume, transaction volume, and number of items sold. The method includes two stages—training and prediction. Both stages apply multiple transformations to convert historical data into model features. The historical data includes business volumes and may include other types of data. This data includes characteristics of the store such as departments, and geographical location as well as weather, climate, and local data that may impact business. The model features may represent these exact values or transformations of the values, including those designed to capture seasonality, trends, and the effects of special events such as sales or store closures.

The training phase employs machine learning regression to create a model that embodies meaningful patterns extracted from historical data. The prediction phase applies the model to the most recent data to generate volume predictions. As predictions may be made before complete historical data is available, previous predictions may be used to "backfill" the historical data to make current predictions. The system may also include a monitoring component to identify when system performance can be improved.

Improved predictions from the forecasting process can lead to more accurate staffing decisions; for example, retail businesses may improve the customer retail experience and the efficiency of their operations and transactions. Correct scheduling results in better use of resource for the employers and therefore reduced costs. It also improves the employee experience, leading to better employee retention.

BRIEF DESCRIPTION OF THE SEVERAL VIEWS OF THE DRAWINGS

Aspects of the described embodiments are more evident in the following description, when read in conjunction with the attached Figures.

DETAILED DESCRIPTION OF THE INVENTION

Unlike many previous approaches to retail volume forecasting, various embodiments include a machine learning approach that uses historical data to "train" the best model for a customer, rather than using a static, hand-tuned, or domain-specific formula or methodology. The forecasting method is also differentiated from various downstream procedures such as alerts or dashboards that may consume and repackage volume forecasts or general architectures for combining forecasting data.

Figure 1:
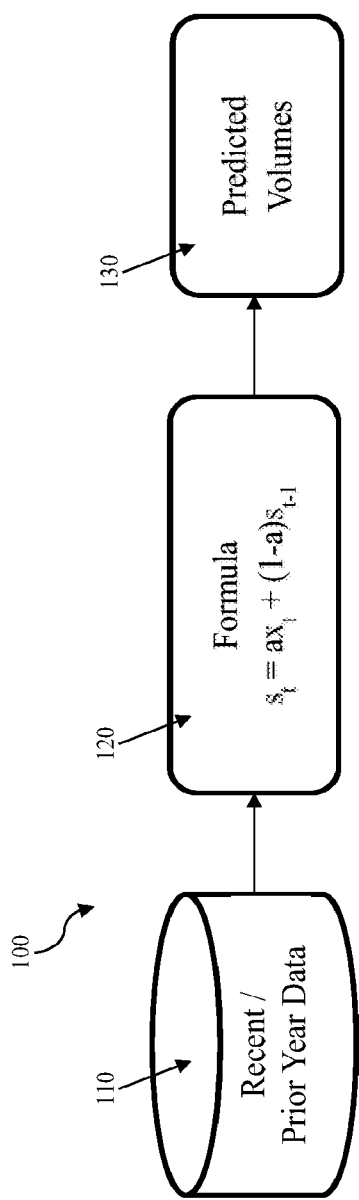
FIG. 1 illustrates a conventional method for providing predictions.

FIG. 1 illustrates a conventional method 100 for providing predictions 130. A static formula 120 is applied to recent information, and/or information regarding the prior year 110, to generate predictions 120.

In various embodiments, machine learning regression is used to dynamically create complex retail volume models based on historical data. Features derived from the historical data include those capturing seasonality, trends, organization structure, department type, and special events. These features may use special encodings to ensure the information is preserved in the model. During a training phase, data is "pooled" so that a single model is built with all of the data from multiple stores or departments. This pooling allows the regression method to produce more accurate models. The use of machine learning regression also enables the use of external data in forecasting retail volumes. A backfilling mechanism may be used during the prediction phase when the data needed to make a prediction is not yet available. This means using the model's predictions for this time period may be treated as actual data, allowing for the multi-day prediction.

Figure 2:
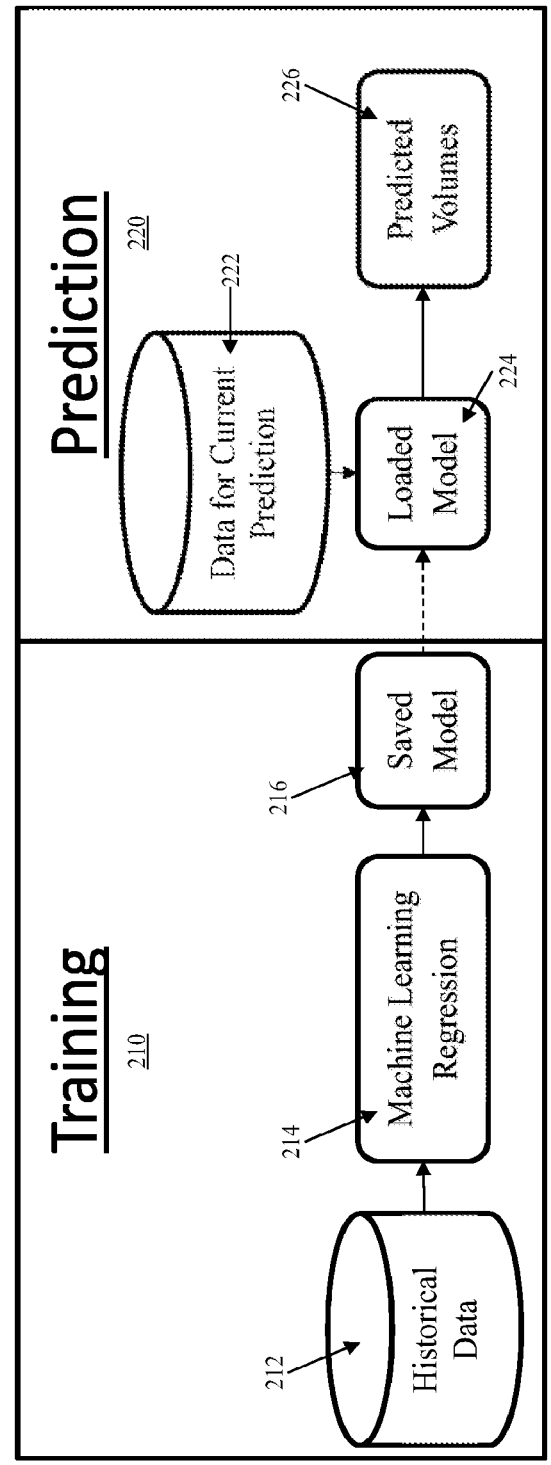
FIG. 2 illustrates a simplified method in accordance with an embodiment for providing predictions, distinguishing the training and prediction phases.

FIG. 2 illustrates a method in accordance with an embodiment for providing predictions. Features calculated from a large store of information 212, such as volume over a large window of time, volume at geographically diverse locations, and weather, etc., are used to train a model 216 using machine learning regression 214. The model 216 is then loaded with current information 220 to create a loaded model 224 that is used to generate predictions 220.

This method for forecasting can be connected to an overall business process. Specifically, the forecasts produced by this method can be used to generate schedules, where the more accurate forecasts lead to more accurate staffing decisions.

Figure 3:
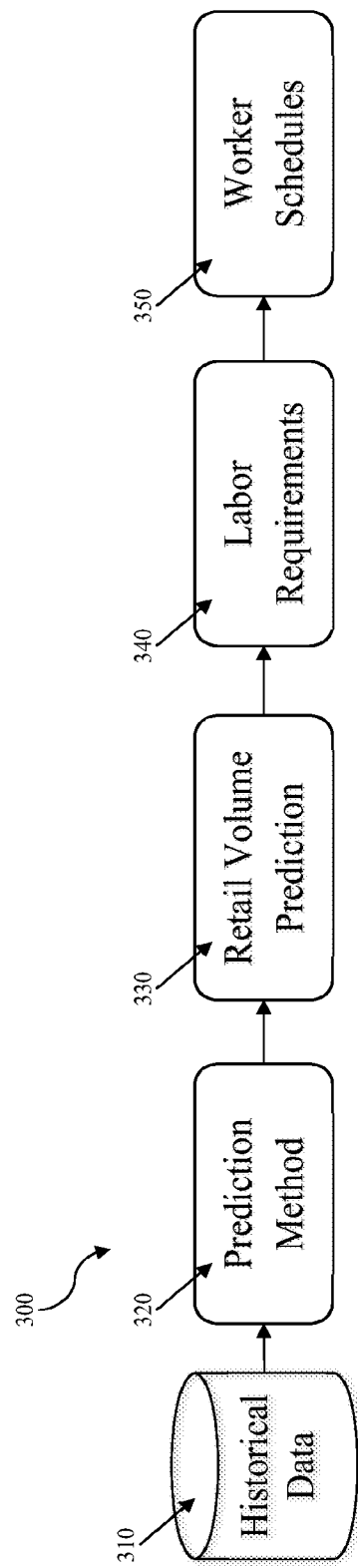
FIG. 3 shows an example of historical data used to determine labor requirements.

Retail volume prediction is a central component of business planning for retail operations, especially for the construction of labor schedules, which must be produced in accordance with the expected demand. FIG. 3 shows the overall business process 300.

As shown in FIG. 3, the historical data 310 is used to generate a prediction method 320.

In contrast to existing commercial approaches, the methods are not confined to using static formulas applied to historical data. Instead, machine learning regression may be used to dynamically create a model based on features derived from the historical data and information about an organization. The machine learning regression is applied in two phases, a training phase and a prediction phase shown in FIG. 2.

The training phase 210 employs machine learning regression 214 to create a model 216 that embodies meaningful patterns extracted from the business's historical data 212. The prediction phase 220 applies the model 216 to the most recent data 222 to generate volume predictions 226. These predictions are for a given time range, for example, in one embodiment a single day, and for a specific unit within the organization, either a store, department, or other business unit with distinct business volume. Both phases 210, 220 involve the construction of "features" from the raw historical volume data, organization structure data, special events, or external data.

Figure 4:
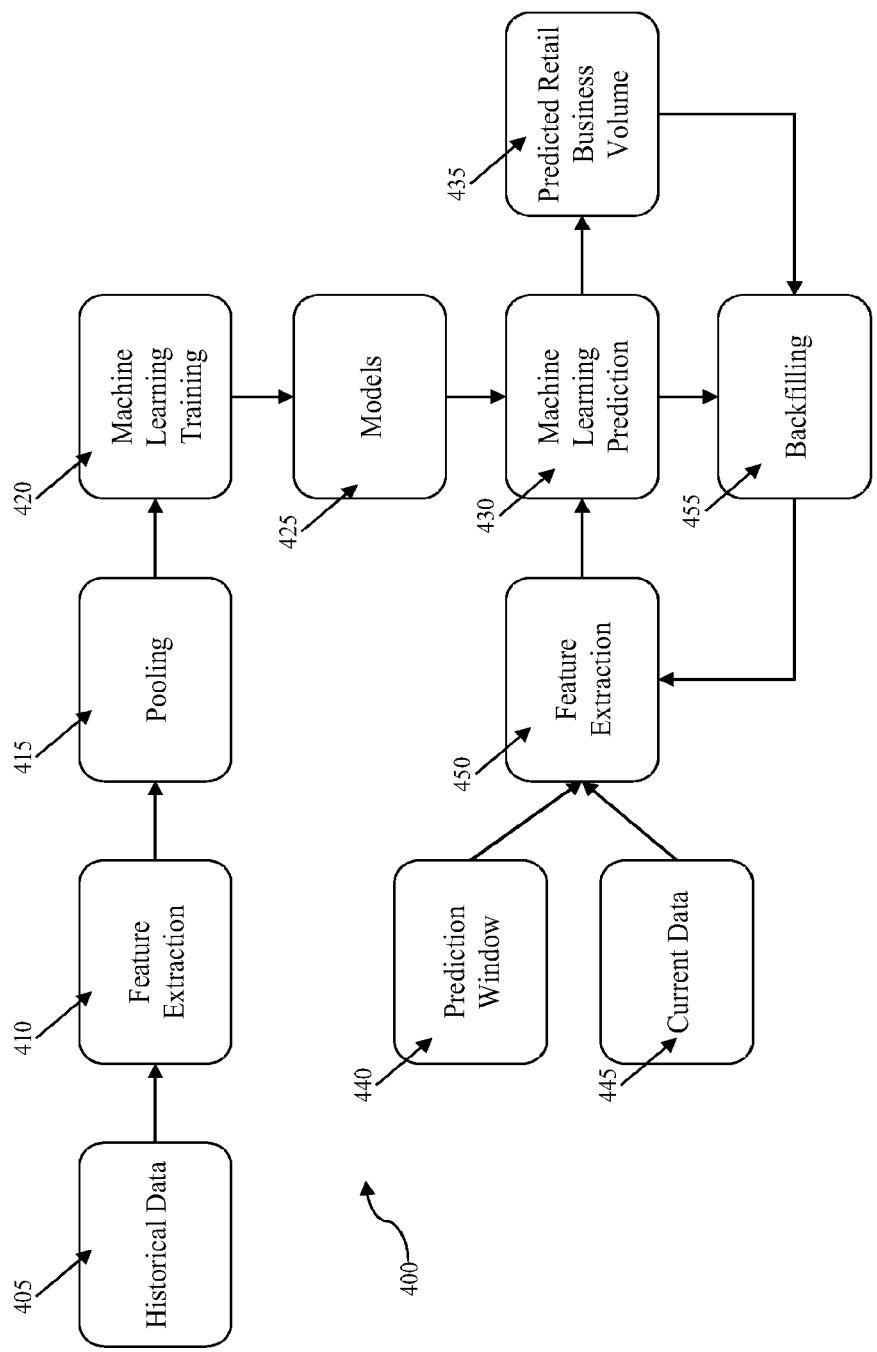
FIG. 4 illustrates a method in accordance with an embodiment for providing predictions.

As shown in FIG. 4, the process 400 includes various steps, which are explained in more detail below. The training phase (top row) includes the gathering/receiving of historical data 405 from which features are extracted 410. Features of various categories are pooled 415 and then used for machine learning training 420 in order to create one or more models 425.

The prediction phase (bottom row) uses the models 425 in order to make a machine learning prediction 430. The prediction 430 is used to predict retail business volume 435 based on a prediction window 440 (e.g., the time frame for the prediction) and current data 445. The window 440 and the current data 445 is used for feature extraction 450 which is then used to update the machine learning prediction 430. Any gaps in the current data 445 may be backfilled 455 with predicted data 435.

Figure 5:
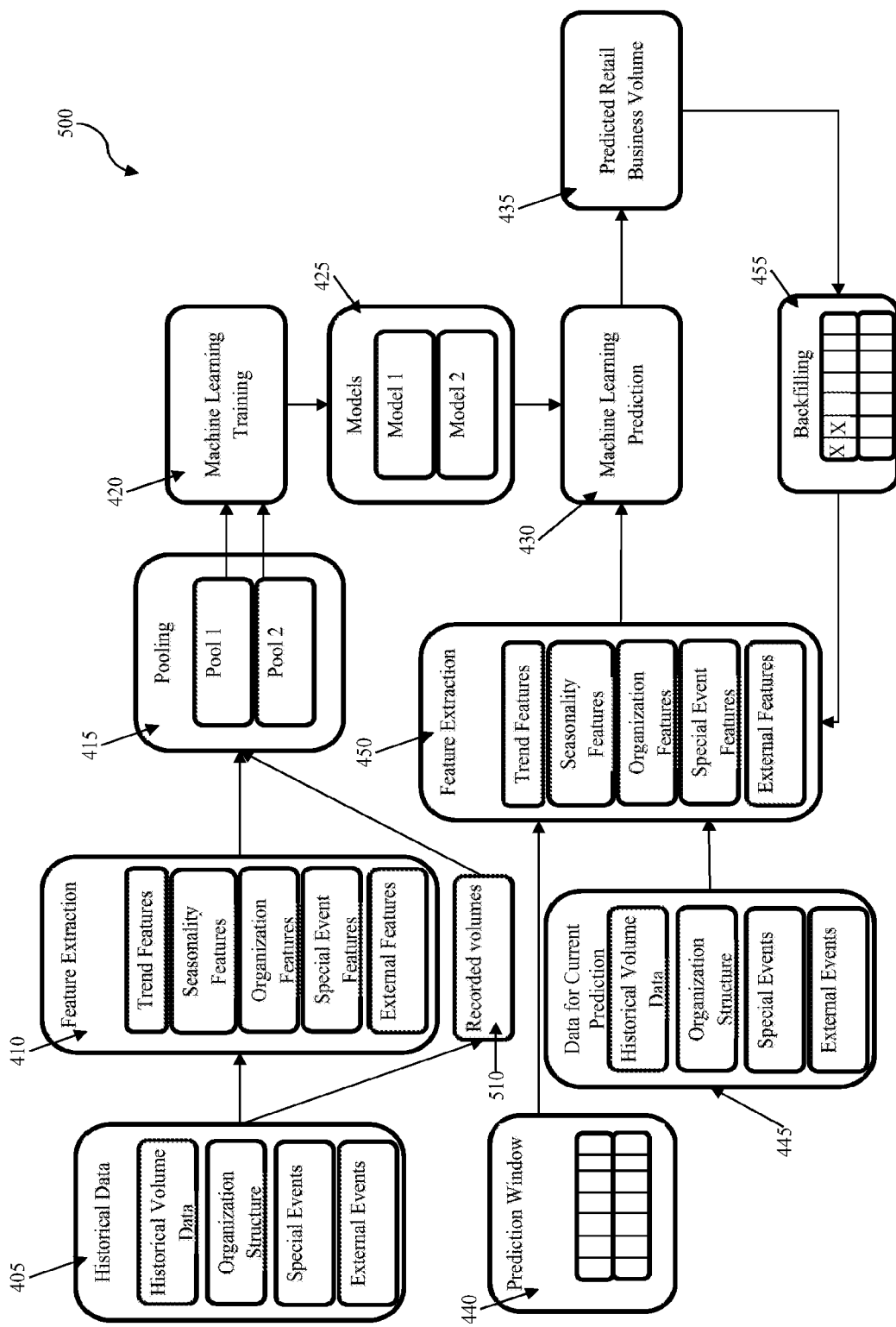
FIG. 5 illustrates a detailed method in accordance with an embodiment for providing predictions.

A more detailed process flow 500 is shown in FIG. 5, with additional sub-components shown for various phases. As shown, the historical data 405 may include historical volume data, organization structure, special events and external events. Additional information may be included, such as, store/department characteristics, climate characteristics, etc.

As described above, historical volume data is a critical component in building a model for prediction of future volumes. Therefore, data structures may be used to store and access historical volume data from different units within an organization. The data can be stored on durable physical storage in a relational database with the schema shown in Table 1.

TABLE 1

| Field | Data Type |
| --- | --- |
| Department ID | Integer |
| Volume Type ID | Integer |
| Date | Date |
| Amount | Decimal |

The department ID uniquely identifies one department in a particular physical location. Further details of its physical location and location in the organization can be looked up (see below).

The volume type can be flexibly defined by the user. In an application for grocery stores, for example, it may denote sales dollars, the number of items sold, or the number of register transactions. These can be stored and forecasted separately as they can drive different aspects of labor staffing.

Data describing the characteristics of units can also be used in the model. The organizational structure can be a hierarchy of any depth and shape. It can be stored in a relational database with the schema shown in Table 2.

TABLE 2

| Field | Data Type |
| --- | --- |
| Organization ID | Integer |
| Department ID | Integer (or null) |
| Parent Organization ID | Integer (or null) |
| Description | String |
| Organization ID | Integer |

Figure 6:
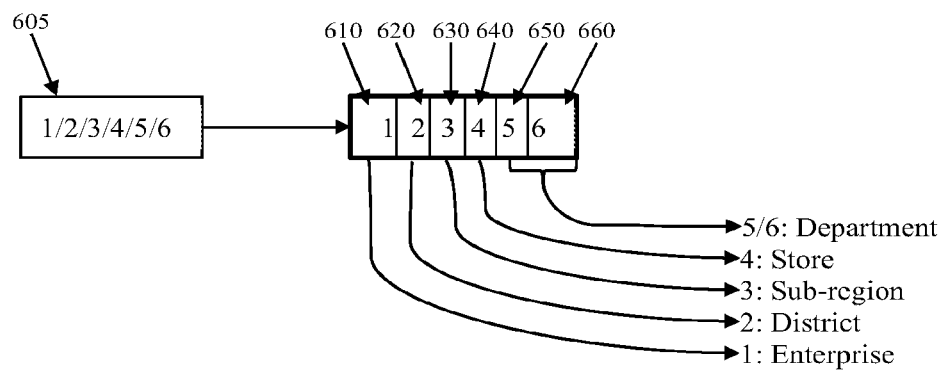
FIG. 6 illustrates an example of the organizational path string.

By traversing the hierarchy for each row where Department ID is not null, the organization ID can be assembled into a single delimited string for use in feature extraction. The algorithm for creating this string may be as follows:

GetOrganizationPath
Input: Table containing organizational layout, oid=Organization ID of interest
Output: String representing fully resolved path through the organizational hierarchy
S=oid
While getAttribute(oid, "Parent Organization ID") is not null:
   S=getAttribute(oid, "Parent Organization ID")+"/"+S
   oid=getAttribute(oid, "Parent Organization ID")
return S
Definitions:
S: string variable containing the organizational path that is being assembled incrementally After resolving the organizational path the algorithm creates a string delimited by '/', it is split into its constituent parts. FIG. 6 illustrates an example of the organizational path string 605 and the parts that represent various data, such as, enterprise 610, district 620, sub-region 630, store 640 and department 650, 660. The configuration specifies which organizational level corresponds to the store, region, and sub-region, and the corresponding array elements are returned for each of these three features. Levels below the store level can be re-joined and referred to as the Department Type.

The system may also store annotations of special events (such as sales, holidays, or store closings) associated with a unit. This data can be stored in a relational database table the schema shown in Table 3.

TABLE 3

| Field | Data Type |
| --- | --- |
| Organization ID | Integer |
| Event ID | Integer |
| Date | Date |

In this embodiment, Table 3 has Organization ID as a key rather than Department ID so that it can specify events at any level of the hierarchy. Any special event configuration may also apply to descendants of the specified Organization ID. The Event ID can be converted to a description, such as "Christmas Eve", by a looking up in a separate table in the same relational database. Table 3 demonstrates one possible specification of the dates of past and future special events. The interpretation of these configurations in a way that facilitates accurate forecasts can be done in downstream processing.

Embodiments of this invention improve upon previous forecasting efforts in that external data such as weather or climate data incorporate easily into the machine learning method without complicated changes to a static formula. The data is formatted such that it can be included in the training and prediction phases without any manual intervention to the procedures. In a Cloud environment, such data could be streamed directly from third party sources and used on demand.

One non-limiting embodiment of the infrastructure for using such third party data is as follows. External data is stored in a key-value store, and can utilize various structures for the key depending on the level to which the external data applies, for example:
1. Enterprise-Date specifying Feature Type, Feature Name, Date;
2. Department-Type-Date specifying Feature Type, Feature Name, Date, Department ID, Volume Type ID; or
3. Store-Month-Year specifying Feature Type, Feature Name, Store ID.

Optionally the external data may specify Month and/or Year.

Additional layouts can be supported for a new data source. For each unique combination of the key fields, the data can provide either a string or a decimal value. Data from each of these specifications can be joined on all specified key columns to create the modeling data. Numeric data values can be passed forward, and string values can be transformed into a unique integer index, for example, by using a hash function. When external data is not available to make predictions but is expected by the trained model, it is treated by the system as missing. Embodiments of the machine learning algorithm may robustly accept such missing values, generating a prediction that is deemed most likely given the non-missing feature values. Specific entries in the historical data may also be marked as anomalous, and these could be treated as missing for the purposes of feature calculation.

Once the raw data covering previous business volumes, organizational structure, special events, and external data is collected, features can be derived from the raw data. In the training phase (top rows of FIGS. 4 and 5) historical data from all stores is transformed (or extracted) into features that summarize the data at different granularities or based on different functions. These features may include the following types.

Trend features capture local or long-term trends in the historical volume data, such as the average volume of the past year, or the average volume from the last four weeks on the same day of the week as the prediction day.

Seasonality features capture timing or periodic aspects of the historical data, such as the month of the year or the day of the week.

Organization features capture aspects of the organizational structure, such as the type of department where volumes are being forecast or the region within the organization for a particular store.

Special event features capture the impact of special events, such as a store sale or closing for a day, which could have an abnormal effect on business volumes. In one embodiment, these features may be the ratio of sales for that day to typical sales on similar days. Such ratios capture the positive or negative inflation of business volumes due to this event and can be used in the model to react to similarly labeled events in the future.

External features, such as weather forecasts or community events may also be extracted from historical data, when available.

Some of these features may be encoded to be used in the rest of the process. The special event features can be encoded in a way that preserves their ordering (in terms of business impact), and, depending on the particular regression method used downstream, possibly their magnitude as well. For the organizational features, an encoding that preserves similarity of geographic regions or alike departments (such as "meat" and "fish and meat" at supermarkets) may be used. In addition, if the model is to be used for predictions on stores or departments not present in the training data, the function for encoding organizational features can be formatted to remain applicable on these new stores. For instance, all new stores may have a "region" attribute that has been previously seen in the historical data. In one embodiment, this criteria is met by assigning for all new stores not present in the training data a "mirror store", similar in structure and business volumes, that is present in the training data and copying all of the organizational attributes of that store.

The extraction (and encoding) process may involve combining multiple raw datapoints, such as computing an average or trendline based on the previous month of business volumes. To do this computation, the data is placed in special data structures and specific feature templates are used to compute similar features.

The data is stored in a distributed computing environment, where the historical data for a single Department and Volume Type are held in memory on a single node of the cluster.

A majority of the features are computed independently. For many features, the data used in model training is configured so that it reflects the forecast horizon that will be used in the production system. This is done using a parameter, fc_horizon, reflecting the number of days between the end of data availability and the date for which volume must be predicted.

Below are non-limiting example algorithms to calculate various features.

Feature: Recent Average
Input: vol=array of volumes for a single department-volume type, n_days=number of days to look back
Output: ra=array of recent averages
For i=n_days to length(vol):

$$ra[i] = \frac{1}{n\_days} \sum_{j=1}^{n\_days} vol[i - \text{fc\_horizon} - j]$$

Feature: Recent Average, this Day of Week
Input: vol=array of volumes for a single department-volume type, n_weeks=number of weeks to look back
Output: ra=array of recent averages for this day of week
For i=n_days to length(vol):

$$ra[i] = \frac{1}{n\_weeks} \sum_{j=1}^{n\_weeks} vol\left[i - 7 * \left(j + \left\lceil \frac{\text{fc\_horizon}}{7} \right\rceil\right)\right]$$

Definitions:

$\left\lceil \frac{\text{fc\_horizon}}{7} \right\rceil$:

divide fc_horizon by seven, then round up to the nearest integer

Feature: Lag
Input: vol=array of volumes for a single department-volume type, n_days=number of days to look back
Output: lag=array of lagged actual volumes
For i=n_days to length(vol):
    lag[i]=vol[i−n_days]

Seasonality features may be captured by extracting different parts of the date as integers. The features include year, month, day of week, day of month, and week of year.

In order to concisely encode the special events, each record is given an "event multiplier," which is a ratio between the volume on the event and the forecasted volume without the event. This ratio can be computed in a number of ways depending on user needs, one non-limiting example is calculated in the following manner.

Feature: Special Event Multiplier
Input: event_layout=map of event configuration where keys are event_ids and values are a map with keys of dates and values of a list of participating_stores; vol=map where keys are (date, dept_id, volume_type
Output: event_mult=map of multipliers, where keys are (event id, store), and values are the multipliers
actuals=new map keyed by (event_id, store) with default value of 0
baselines=new map keyed by (event_id, store) with default value of 0
event_mult=new map keyed by (event_id, store)
for event_id, dates in event_layout:
  for date, participating_stores in event_layout:
    for store in participating_stores:
      for dept_id in GetDepartmentsForStore(store):
        actual_volume=vol[(date, dept_id)]
        baseline=GetSimpleForecast(date, dept_id)
        actuals[(event_id, store)]+=actual_volume
        baselines[(event_id, store)]+=baseline
for event_id, store in keys(actuals):
  event_mult[(event_id, store)]=actuals [(event_id, store)]/baselines[(event_id, store)]

In order to minimize processing time, trend features can be computed as ratios of previously computed features. Using a common configuration, the system will take the ratio of volume over the past 30 days vs. the past 365 days. Large values indicate a positive trend in the recent month, and values below one indicate a negative trend. Other versions of this feature vary the size of the two windows and/or limit the analysis to volumes falling on the same day of week as the day to be predicted.

After the features are constructed, the training phase continues with a "pooling" of features. While each feature is produced for a particular unit (such as a store or department) in the organization, the process does not necessarily create a model for every store. Where conventional methods may silo the data from different departments or other prediction units, one non-limiting embodiment combines data from multiple stores, departments, or other business units across the whole organization.

Figure 7:
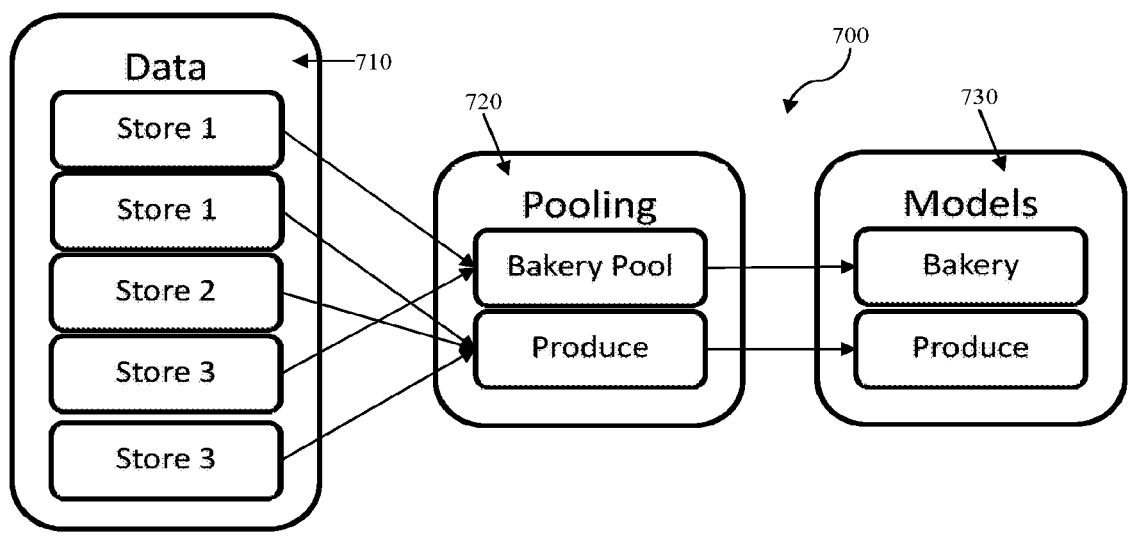
FIG. 7 demonstrates data pooling used to generate models in accordance with an embodiment.

The data 710 from many similar stores or departments can be put into one of many pools 720. At the extremes, all units that are predicted may go into a single pool or into their own individual pools. Data 710 may often be pooled by the type of business being predicted 730 (for example, items or sales) and the type of store or department. In one, non-limiting embodiment, there is a pool for each type of generic department (such as produce, meat, bakery, etc. in a grocery chain) across a whole organization, as seen in FIG. 7.

This pooling may be accomplished by including features describing each data point and flexible configuration of the separation into each "pool."

In order to allow the model to identify characteristics that may be unique to a particular store or region, the organizational and geographic features can be included in the model. If the model were trained on only one department and volume type at a time, these features would take on the same value for each model and therefore add no value.

The user can configure the system to create a separate model for different partitioning schemes of the data. In one, non-limiting embodiment, the "pooling strategy" contains a list of column names, which may be referred to as "partitioning columns." Each unique combination of the values in these fields is associated with a separate model. One, non-limiting configuration creates a separate model for each volume type, but includes all stores and department types in the same model. In this case, the partitioning column is Volume Type. Other variants can create a single model for all volume types, or create a separate model for each department type and volume type.

The process of training the models using pooling can be described as follows:
TrainAllModels
Input: feature_configuration, model_configuration, database=data source containing all data required by features; pooling_strategy=object that can separate the data into partitions based on the user configuration
Output: models=map keyed by partition identifiers and with values as a binary encoding of the trained model
  volumes=FetchDataFromDatabase(database)
  data=ComputeFeatures(volumes, feature_configuration)
  For partition_key, partition_data in pooling_strategy.partition(data):
    models[partition_key]=TrainSingleModel(partition_data, model_configuration)
  return models In the case where all data within each volume type is pooled together, the pooling strategy's 'partition' function may be similar to the following:
PoolByVolumeType
Input: data=in-memory table of all data after feature computation
  Output: An iterator over the partitioned data
  vol_types=GetUniqueVolumeTypes(data)
  for vol_type in vol_types:
    yield vol_type, data.filter(volume_type==vol_type)

Unlike conventional forecasting methods that relied on static formulas, various embodiments contain a training phase where models are dynamically constructed based on historical features mined above. The training phase completes with the construction of one or more models, e.g., one for each pool.

The pooled features and recorded historical volumes are fed to a machine learning regression algorithm that dynamically constructs a model mapping the features to the predicted volume. Such regression methods automatically determine the most salient and predictive features for a given pool of training data to minimize an objective function. In one embodiment, an ensemble of regression trees may be used as the model, with branches based on the values of the derived features and the objective of minimizing the squared loss between the recorded volumes and the resulting predictions.

One, non-limiting example of such a regression function to train the model is a Gradient Boosted Model Training function, described as:
TrainSingleModel (Gradient Boosted Model Training)
Input: data=in-memory table of all data after feature computation, potentially pooled by a pooling strategy, model_configuration=(n_rounds=number of boosting rounds to complete, learning_rate=amount to update after each round, $\mathcal{L}(y,\hat{y})$=loss function comparing actual outcome vs. prediction)
Output: model=trained model $$\text{model.stages}[0] = \underset{c}{\operatorname{argmin}} \sum\nolimits_{i=1}^{N} L(y_i, c)$$

for i=1; i<n_rounds; i++
  grad=GetNegativeGradient($\mathcal{L}$, data, model)
  tree=BuildTree(data, grad, $\mathcal{L}$)
  model.stages[i]=tree
Definitions:
model: object storing the full regression model
model.stages: array representing each stage of the model; model.stage[i] can be a constant when i=0 or a function representing a regression tree when i>0
c: constant representing initial prediction
N: number of observations in the data
$y_i$: the actual volume in row i of data $$\underset{c}{\operatorname{argmin}} \sum\nolimits_{i=1}^{N} L(y_i, c):$$

The constant value that minimizes the loss between itself and the observed data y and the constant c For further detail on the fitting of Gradient Boosted Decision Trees see: Ridgeway, Greg. "Generalized Boosted Models: A guide to the gbm package." Update 1.1 (2007): 2007; and Friedman, Jerome, Trevor Hastie, and Robert Tibshirani. The elements of statistical learning. Vol. 1. Springer, Berlin: Springer series in statistics, 2001.

The second phase of the process is the prediction phase (bottom row of FIG. 4). The prediction phase takes place over a specified time window. In one embodiment, this may involve predicting daily volumes over the course of 14 days, as shown in FIG. 5 (bottom left). The features used to produce each of these predictions are derived from the current data using the same functions used during the training phase, with the following modifications:
  Recorded volumes for the prediction period are not observed since this phase is not fitting a model but rather predicting volume itself
  Organizational features are checked to see if they match the organizational features at the time of modeling, so if any organizational attributes have changed, such as the relabeling of a store's region, a mapping can be done to the prior encoding to ensure the model makes a valid prediction. In one embodiment, this mapping is done by assigning any newly opened stores a "mirror store" from the existing stores, and copying the organizational information from the mirror store.
  Based on the size of the prediction window, trend features and other features that require recent data may not have all the data for their construction. For instance, if the prediction window is 14 days, with predictions for each day, and one of the features is the volume from 7 days ago, then the prediction for the eighth day lacks the necessary data to construct this feature. In this case, backfilling may be used to augment the current data with the prediction for the missing days, in this case the model's prediction of day 1.

Given these features, the model from the appropriate pool in the training phase can be applied to the newly derived features and will make a prediction of business volume. This prediction is then carried forward in the overall business process to, for instance, predict labor demand and create worker schedules to fit that demand.

In order to minimize changes to the model and computational cost to support the surrounding business processes, such as weekly schedule generation, various embodiments use a volume prediction process that can be run periodically, using the same trained model to make predictions for the new period. Accordingly, the model may be stored after training and loaded into memory for prediction purposes.

In order to store the models, each model is encoded into a binary format. Before being transferred to persistent storage, the models are stored in computer memory. During storage, each model is written to magnetic storage media, and its file path contains a string representation of the partition identifier. This may be done using the following algorithm:

```
MakeFilePath
Input: partition_key, pooling_strategy, base_path
Output: file_path
file_path=base_path
for i, partition_field in enumerate(pooling_strategy. partitioning_columns)
    file_path+="/"+partition_field+"/"+partition_key[i]
return file_path+".bin"
```

To retrieve the models, the models are read from the base folder, and the pooling strategy is used to recreate the in-memory map using the following algorithm:

```
DecodeFilePath
Input: model_path, pooling_strategy
Output: partition_key
partition_key=empty ArrayList
path_components=RemoveFileExtension(model_path)
    .split("/")
for i=2 to length(path_components)
    partition_key.append(path_components[i])
return partition_key
```

For example, where the partition column is only Volume Type, the partition key could be [1], which may be converted into a file path as "models/volume_type/1.bin".

In order to make predictions from a loaded model, the current data representing recent volumes, organizational structure, etc. for a given unit are translated into model features and the model is then used for the predictions. This process can proceed as follows:

```
MakePredictions
Input: database, base_folder containing trained models,
pooling_strategy, date_range to forecast
Output: list of forecasts, where each element is (department_id, volume_type, date, forecast_value)
raw_data=ReadAllHistoricalData(database)
processed_data=ComputeFeatures(raw_data)
models=ReadTrainedModels(base_folder, pooling_strategy)
working_start_date=GetLastDayInHistoricalData( ).plusDays(1)
while working_start_date<date_range.end:
    predictions=MakePredictionsForDateRange(models,
        processed_data, working_start_date, working_start_date.plusDays(7), pooling_strategy)
    processed_data=Union(processed_data, predictions)
    working_start_date=working_start_date.plusDays(7)
return processed_data.filter(date in date_range)
MakePredictionsForDateRange
Input: models, processed_data, start_date, end_date, pooling_strategy
Output: List of (department, volume type, date, forecast)
needed_predictions=MakeRecordsForRange(processed_data, start_date, end_date)
prediction_data=ComputeFeatures(needed_predictions, processed_data)
return PredictUsingPooledModels(models, pooling_strategy, prediction_data)
PredictUsingPooledModels
Input: models, pooling_strategy, prediction_data
Output: Iterator over all predictions, each of (department, volume type, date, forecast)
For partition_key, partition_data in pooling_strategy.partition(data):
    model=models[partition_key]
    for observation in partition_data:
        yield (observation. department, observation.volume_
            type, observation. date, PredictAtPoint(observation.features)
PredictAtPoint
Input: x=vector of features for a single department, volume_type, and day; model=Gradient Boosted Decision Tree model
Output: Decimal number representing the forecast
prediction=0
for tree in model:
    prediction+=tree.predict(x)
return prediction
MakeRecordsForRange
Input: processed_data, start_date, end_date
Output: List of (department, volume type, date)
unique_nodes=GetUniquePairs(processed_data, [department_id, volume_type])
records=new ArrayList
for node in unique_nodes:
    for date=start_date; date<=end_date;
            startDate=startDate.plusDays(1):
        records.append((node.department_id, node.volume_type, date))
return records
```

Predictions may be made for time periods between when historical data ends and the end of the prediction date range, even though when there is a gap between the start of the date range and the end of available data. The system makes predictions on those dates that are not directly of interest in order to avoid handling of missing data when computing features. This way, the system may avoid carefully validating the feature configuration against the specification of the prediction window, and can make predictions at varying time horizons with no changes.

The system also contains the capability to retrain a model with more recent data (potentially including all the data used for the previous model as well). Depending on the dynamics of business, the system updates the models at regular intervals (or in response to various events, such as, upon user request, when a prediction is off by a given threshold, etc). This update may involve deleting the existing models and repeating the training process. Alternatively, the existing models may be amended or supplemented based on the results of the training process.

In addition to scheduled updates, a series of checks can be done to estimate the benefit of updating the models. One such check is the number of changes to the organizational layout: it is possible to continue to use the layout from the time of model training, but users may have refined their knowledge and improved the structure. If a large number of changes have occurred, the model can be updated on-demand. In addition, before deleting the old models, a series of tests could be conducted to confirm the accuracy of the new models. This can be done by omitting some portion of historical data from training, and testing the trained models' accuracy against this data.

Figure 8:
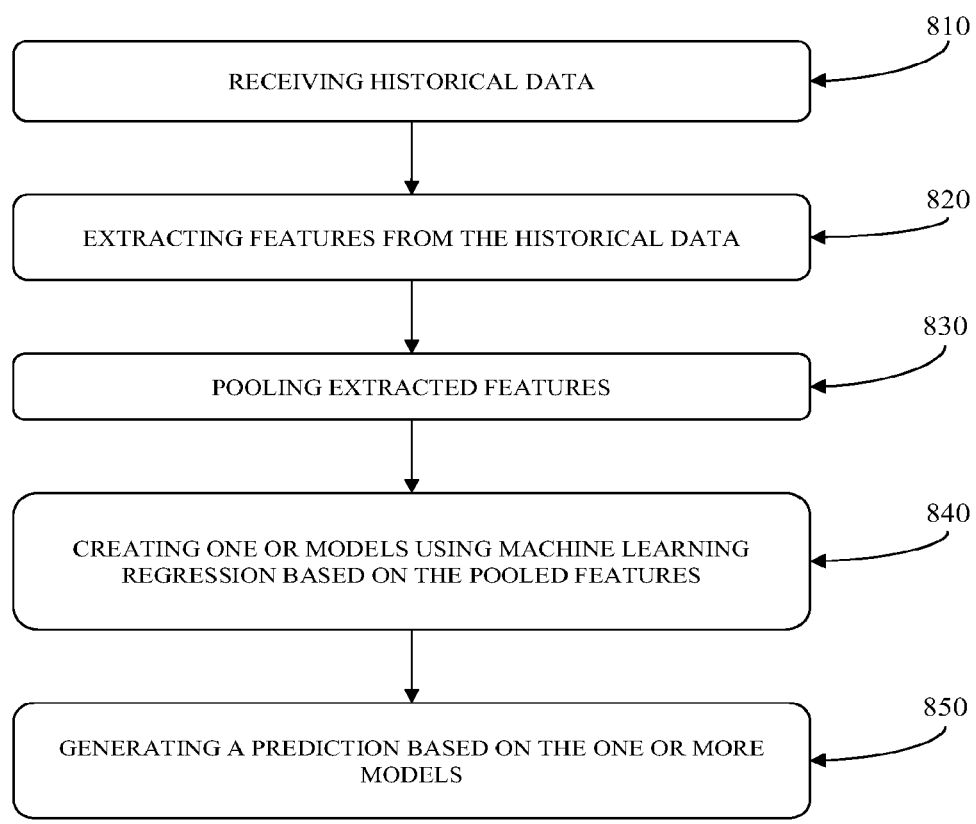
FIG. 8 is a logic flow diagram that illustrates the operation of a method, and a result of execution of computer program instructions embodied on a computer readable memory, in accordance with various embodiments.

As described above, various embodiments provide a method, apparatus and computer program(s) to provide accurate forecasts, such as retail business volume. FIG. 8 is a logic flow diagram that illustrates a method, and a result of execution of computer program instructions, in accordance with various embodiments. In accordance with an embodiment a method performs, at Block 810, a step of receiving historical data. At Block 820, the method performs a step of extracting features from the historical data. The features from similar sources are pooled together at Block 830. The method performs, at Block 840, a step of creating one or more models using machine learning regression based on the pooled features. At Block 850, the method also performs a step of generating a prediction based on the one or more models.

The various blocks shown in FIG. 8 may be viewed as method steps, as operations that result from use of computer program code, and/or as one or more logic circuit elements constructed to carry out the associated function(s).

In a further embodiment of the method above, the historic data may include volume data, organizational structure data, special event data and/or external event data.

In another embodiment of any one of the methods above, extracting the features includes encoding the features in order to preserve data regarding similarity of geographic regions and/or alike departments.

In a further embodiment of any one of the methods above, a model is created for each pool of extracted features.

In another embodiment of any one of the methods above, the method also includes backfilling data in a prediction window based on the one or more models.

In a further embodiment of any one of the methods above, the method also includes predicting a business volume based on the prediction. The method may also include determining labor requirements based on the predicted business volume. The method may further include scheduling workers based on the labor requirements.

Figure 9:
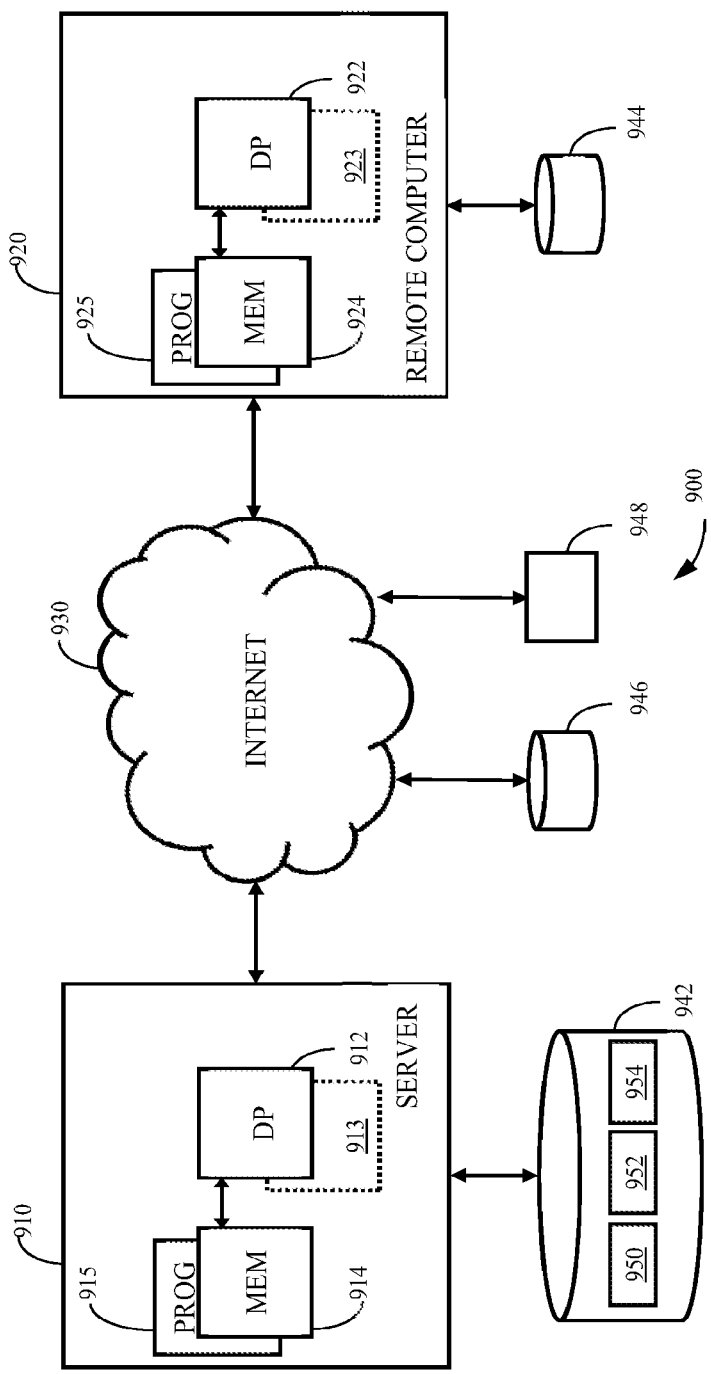
FIG. 9 shows a simplified block diagram of a device that is suitable for practicing various embodiments.

FIG. 9 shows a block diagram of a system 900 that is suitable for use in practicing various embodiments. In the system 900 of FIG. 9, the server 910 includes a controller, such as a data processor (DP) 912 and a computer-readable medium embodied as a memory (MEM) 914 that stores computer instructions, such as a program (PROG) 915. Server 910 may communicate with a remote computer 920, for example, via the internet 930.

Remote computer 920, such as a computer system at a local retail business, includes a controller, such as a data processor (DP) 922 and a computer-readable medium embodied as a memory (MEM) 924 that stores computer instructions, such as a program (PROG) 925. Server 910 and/or remote computer 920 may also include a dedicated processor, for example a feature extraction processor 913, 923. Both server 910 and/or remote computer 920 may communicate with other retail computer systems 948, for example, via the internet 930 (as shown), and/or via direct communications channels (such as a wireless connection or a physical connection).

Databases 942, 944, 946 may be connected directly to the server 910, the remote computer 944 or the internet 930. As shown, database 942 stores historic data 950, store/department characteristics 952 and special events data 954; however, this information may be stored separately (or together) in any of the databases 942, 944, 946.

The programs 915, 925 may include program instructions that, when executed by the DP 912, 922, enable the server 910 and/or remote computer 920 to operate in accordance with an embodiment. That is, various embodiments may be carried out at least in part by computer software executable by the DP 912 of the server 910, the DP 922 of the remote computer 920, by hardware, or by a combination of software and hardware.

In general, various embodiments of the server 910 and/or remote computer 920 may include tablets and computers, as well as other devices that incorporate combinations of such functions.

The MEM 914, 924 and databases 942, 944, 946 may be of any type suitable to the local technical environment and may be implemented using any suitable data storage technology, such as magnetic memory devices, semiconductor based memory devices, flash memory, optical memory devices, fixed memory and removable memory. The DP 912, 922 may be of any type suitable to the local technical environment, and may include general purpose computers, special purpose computers, microprocessors and multicore processors, as non-limiting examples.

SUMMARY

In one, non-limiting embodiment, a method is provided that uses machine learning regression to dynamically create complex models based on historical data. The method includes two phases: a training phase where a model is fit to features derived from historical data and organizational information, and a prediction phase where the model is used with current information to predict future volumes. This approach is in stark contrast to traditional methods that use a static formula to make predictions.

Features derived from the historical data include those capturing seasonality and trends, such as, features labeling the month of the year or trends in historical volumes (e.g., an average of the last six weeks of historical volumes on a particular day of the week).

During the training phase, data is "pooled" so that a single model is built with all of the data from multiple stores or departments. Pools are determined based on the business structure of the organization or another external process. This pooling allows the regression method to produce complex formulas that respect cases that might be rare at a single store, but more common across the whole organization.

The machine learning regression enables the use of external data in forecasting retail volumes. Since the regression technique dynamically determines what combinations of features are relevant to the model, important external features such as weather or community event calendars can be incorporated seamlessly into the model.

Organizational structure features, including department type, regions, and store size may be used to increase the accuracy of the model. This information is encoded in a manner usable by the regression system and the organizational tags are encoded at model time for continued use.

Special events (e.g., sales or store closures) may be modeled using features that describe their numeric effect, such as a multiplier or ordinal value describing their effect against historical averages on a given day. The model can then use these features for future predictions on event days or to determine that certain data is to be treated differently in the complex model.

A backfilling mechanism may be used during the prediction phase when the data to make a prediction is not yet available. Since retailers typically make predictions for every day in a time period, such as 14 days, the data to construct a feature such as "last week's average" may not be available at prediction time. To estimate such a feature, the model's predictions for this time period may be treated as actual data, allowing for the multi-day prediction.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable media can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device. The computer readable medium may be a non-transitory computer readable medium (e.g., CD-ROM, RAM, flash memory, etc.)

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A computer-implemented method of training machine learning models for making simulated estimations, the method comprising:
   collecting, from a database, a set of historical business data;
   applying one or more transformations to the set of historical business data to create a set of model features;
   separating the set of model features into three or more pools based at least in part on a weather forecast, each pool comprising:
      one or more model features of the set that are homogeneous with respect to a common value, and
      a different type of feature from the other of the three or more pools;
   for each of the three or more pools, dynamically creating a corresponding training set comprising the one or more model features of the pool and at least some of the historical business data;
   for each of the three or more pools, creating a corresponding machine learning model;
   for each training set, training the machine learning model, that corresponds to the pool that corresponds to the training set, on the training set based at least in part on gradient boosting to predict a retail volume;
   generating, a predicted labor demand by predicting, via at least one of the machine learning models, a labor demand value for a gap between an end date of the historical business data and a start date of a prediction time period;
   generating a worker schedule based at least in part on the predicted labor demand; and
   updating the machine learning models via at least:
      deleting and recreating the machine learning models, and
      for each training set, retraining the machine learning model, that corresponds to the pool that corresponds to the training set, on the training set to improve the prediction of the retail volume via improving the correlation of each model to the features within the corresponding pool;
   wherein:
      each of the set of model features corresponds to a store; and
      each of the set of model features corresponds to two or more departments of a same type and each department is from a different store.

2. A system comprising:
   at least one processor; and
   a memory device that stores an application that adapts the at least one processor to:
   collect a set of historical business data from a database;
   apply one or more transformations to the set of historical business data to create a set of model features;
   separate the set of model features into three or more pools based at least in part on a weather forecast, each pool comprising:
      one or more model features of the set that are homogeneous with respect to a common value, and
      a different type of feature from the other of the three or more pools;
   for each of the three or more pools, dynamically create a corresponding training set comprising the one or more model features of the pool and at least some of the historical business data;
   for each of the three or more pools, create a corresponding machine learning model;
   for each training set, train the machine learning model, that corresponds to the pool that corresponds to the training set, on the training set based at least in part on gradient boosting to predict a retail volume;
   generate a predicted labor demand by predicting, via at least one of the machine learning models, at labor demand value for a gap between an end date of the historical business data and a start date of a prediction time period;
generate a worker schedule based at least in part on the predicted labor demand; and
update the machine learning models via at least:
   deleting and recreating the machine learning models as part of updating the machine learning models; and
   for each training set, retraining the machine learning model, that corresponds to the pool that corresponds to the training set, on the training set to improve the prediction of the retail volume via improving the correlation of each model to the features within the corresponding pool;
wherein:
   each of the set of model features corresponds to a store; and
   each of the set of model features corresponds to two or more departments of a same type and each department is from a different store.

3. A non-transitory computer-readable medium storing instructions that adapt at least one processor to:
collect a set of historical business data from a database;
apply one or more transformations to the set of historical business data to create a set of model features;
separate the set of model features into three or more pools based at least in part on a weather forecast, each pool comprising:
   one or more model features of the set that are homogeneous with respect to a common value, and
   a different type of feature from the other of the three or more pools;
for each of the three or more pools, dynamically create a corresponding training set comprising the one or more model features of the pool and at least some of the historical business data;
for each of the three or more pools, create a corresponding machine learning model;
for each training set, train the machine learning model, that corresponds to the pool that corresponds to the training set, on the training set based at least in part on gradient boosting to predict a retail volume;
generate a predicted labor demand by predicting, via at least one of the machine learning models, a labor demand value for a gap between an end date of the historical business data and a start date of a prediction time period;
generate a worker schedule based at least in part on the predicted labor demand; and
update the machine learning models via at least:
   deleting and recreating the machine learning models, and
   for each training set, retraining the machine learning model, that corresponds to the pool that corresponds to the training set, on the training set to improve the prediction of the retail volume via improving the correlation of each model to the features within the corresponding pool;
wherein:
   each of the set of model features corresponds to a store; and
   each of the set of model features corresponds to two or more departments of a same type and each department is from a different store.

4. The computer-implemented method of claim 1, wherein the model features are separated into the three or more pools further based at least in part on a seasonality.

5. The system of claim 2, wherein the model features are separated into the three or more pools further based at least in part on a seasonality.

6. The non-transitory computer-readable medium of claim 3, wherein the model features are separated into the three or more pools further based at least in part on a seasonality.

7. A computer-implemented method of training machine learning models for making simulated estimations, the method comprising:
collecting, from a database, a set of historical business data;
applying one or more transformations to the set of historical business data to create a set of model features;
separating the set of model features into three or more pools based at least in part on a seasonality, each pool comprising:
   one or more model features of the set that are homogeneous with respect to a common value, and
   a different type of feature from the other of the three or more pools;
for each of the three or more pools, dynamically creating a corresponding training set comprising the one or more model features of the pool and at least some of the historical business data;
for each of the three or more pools, creating a corresponding machine learning model;
for each training set, training the machine learning model, that corresponds to the pool that corresponds to the training set, on the training set based at least in part on gradient boosting to predict a retail volume;
generating, a predicted labor demand by predicting, via at least one of the machine learning models, a labor demand value for a gap between an end date of the historical business data and a start date of a prediction time period;
generating a worker schedule based at least in part on the predicted labor demand; and
updating the machine learning models via at least:
   deleting and recreating the machine learning models, and
   for each training set, retraining the machine learning model, that corresponds to the pool that corresponds to the training set, on the training set to improve the prediction of the retail volume via improving the correlation of each model to the features within the corresponding pool;
wherein:
   each of the set of model features corresponds to a store; and
   each of the set of model features corresponds to two or more departments of a same type and each department is from a different store.

8. The computer-implemented method of training machine learning models for making simulated estimations of claim 7 further comprising:
   for each machine learning model, testing the machine learning model to determine an accuracy of the machine learning model.

9. A system comprising:
at least one processor; and
a memory device that stores an application that adapts the at least one processor to:
   collect a set of historical business data from a database;
   apply one or more transformations to the set of historical business data to create a set of model features;

separate the set of model features into three or more pools based at least in part on a seasonality, each pool comprising:
one or more model features of the set that are homogeneous with respect to a common value, and
a different type of feature from the other of the three or more pools;
for each of the three or more pools, dynamically create a corresponding training set comprising the one or more model features of the pool and at least some of the historical business data;
for each of the three or more pools, create a corresponding machine learning model;
for each training set, train the machine learning model, that corresponds to the pool that corresponds to the training set, on the training set based at least in part on gradient boosting to predict a retail volume;
generate a predicted labor demand by predicting, via at least one of the machine learning models, at labor demand value for a gap between an end date of the historical business data and a start date of a prediction time period;
generate a worker schedule based at least in part on the predicted labor demand; and
update the machine learning models via at least:
deleting and recreating the machine learning models as part of updating the machine learning models; and
for each training set, retraining the machine learning model, that corresponds to the pool that corresponds to the training set, on the training set to improve the prediction of the retail volume via improving the correlation of each model to the features within the corresponding pool;
wherein:
each of the set of model features corresponds to a store; and
each of the set of model features corresponds to two or more departments of a same type and each department is from a different store.

10. The system of claim 9, wherein the application further adapts the at least one processor to:
for each machine learning model, test the machine learning model to determine an accuracy of the machine learning model.

11. A non-transitory computer-readable medium storing instructions that adapt at least one processor to:
collect a set of historical business data from a database;
apply one or more transformations to the set of historical business data to create a set of model features;
separate the set of model features into three or more pools based at least in part on a seasonality, each pool comprising:
one or more model features of the set that are homogeneous with respect to a common value, and
a different type of feature from the other of the three or more pools;
for each of the three or more pools, dynamically create a corresponding training set comprising the one or more model features of the pool and at least some of the historical business data;
for each of the three or more pools, create a corresponding machine learning model;
for each training set, train the machine learning model, that corresponds to the pool that corresponds to the training set, on the training set based at least in part on gradient boosting to predict a retail volume;
generate a predicted labor demand by predicting, via at least one of the machine learning models, a labor demand value for a gap between an end date of the historical business data and a start date of a prediction time period;
generate a worker schedule based at least in part on the predicted labor demand; and
update the machine learning models via at least:
deleting and recreating the machine learning models, and
for each training set, retraining the machine learning model, that corresponds to the pool that corresponds to the training set, on the training set to improve the prediction of the retail volume via improving the correlation of each model to the features within the corresponding pool;
wherein:
each of the set of model features corresponds to a store; and
each of the set of model features corresponds to two or more departments of a same type and each department is from a different store.

12. The non-transitory computer-readable medium of claim 11, wherein the instructions further adapt at least one processor to:
for each machine learning model, test the machine learning model to determine an accuracy of the machine learning model.

* * * * *